(12) United States Patent
Vallelonga, Sr. et al.

(10) Patent No.: US 7,296,683 B1
(45) Date of Patent: Nov. 20, 2007

(54) FERROUS METAL DETECTOR WITH ALARM

(76) Inventors: Kenneth M. Vallelonga, Sr., 412 S. Virginia Ave., Bridgeport, WV (US) 26330; Derick J. Haddix, Route 1 Box 299-35, Mount Clare, WV (US) 26408

(*) Notice: Subject to any disclaimer, the term of this patent is extended or adjusted under 35 U.S.C. 154(b) by 179 days.

(21) Appl. No.: 11/236,118

(22) Filed: Sep. 26, 2005

Related U.S. Application Data

(63) Continuation-in-part of application No. 10/334,847, filed on Dec. 30, 2002, now abandoned.

(60) Provisional application No. 60/382,448, filed on May 22, 2002.

(51) Int. Cl.
*B03C 1/00* (2006.01)

(52) U.S. Cl. .................. 209/224; 209/223.1; 209/215; 209/636; 340/551; 324/234; 324/239

(58) Field of Classification Search .............. 209/224, 209/223.1, 215, 636
See application file for complete search history.

(56) References Cited

U.S. PATENT DOCUMENTS

| | | | | |
|---|---|---|---|---|
| 3,826,973 A | * | 7/1974 | Pflaum | 324/329 |
| 4,279,744 A | * | 7/1981 | Antonwitsch | 209/214 |
| 4,367,138 A | * | 1/1983 | Kustas | 209/224 |
| 4,494,657 A | * | 1/1985 | Oldenkamp | 209/636 |
| 4,875,567 A | * | 10/1989 | Fitton | 194/318 |
| 5,001,425 A | * | 3/1991 | Beling et al. | 324/239 |
| 5,659,247 A | * | 8/1997 | Clements | 324/239 |
| 6,833,789 B1 | * | 12/2004 | Carmen et al. | 340/551 |
| 2002/0067163 A1 | * | 6/2002 | Goldberg et al. | 324/234 |

* cited by examiner

*Primary Examiner*—Patrick Mackey
*Assistant Examiner*—Terrell Matthews

(57) ABSTRACT

An electronic ferrous metal detector with an alarm includes a non-ferrous core positioned circumferentially about an opening in an object, such as a hole in a garbage can lid. A pick-up coil having a sufficient number of windings is wound about the non-ferrous core for detecting magnetized objects passing therethrough and generating a voltage. The voltage is passed through an op-amp and into a comparator/detector, where a preset reference point is compared to the voltage from the op-amp. Once the voltage passes the preset reference point, the comparator goes to a high output and powers a switch, such as a SCR or Triac, which is gated on and carries the current and feeds the voltage to an alarm that provides an audible or visual signal that a magnetized piece of ferrous material has passed through the metal detector.

20 Claims, 7 Drawing Sheets

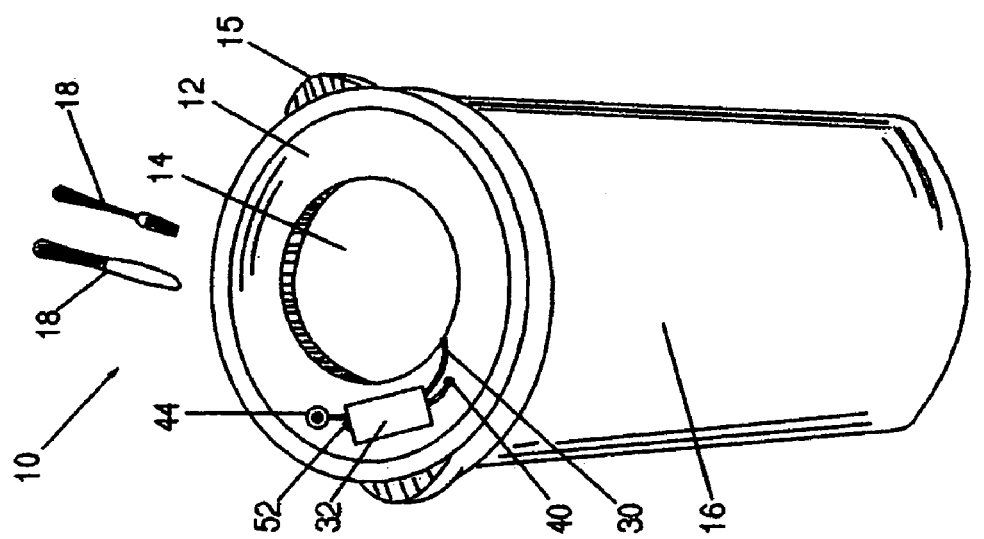

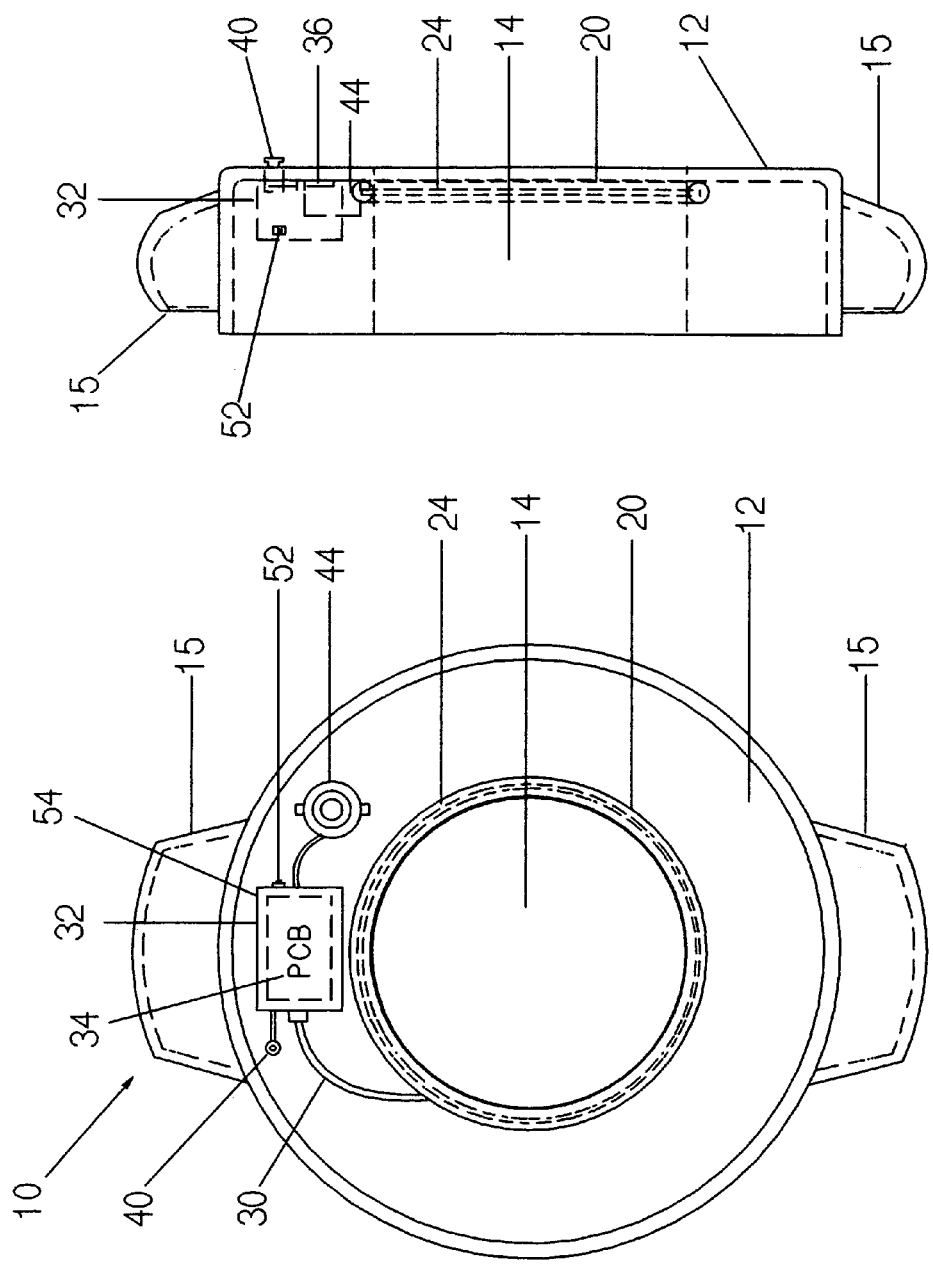

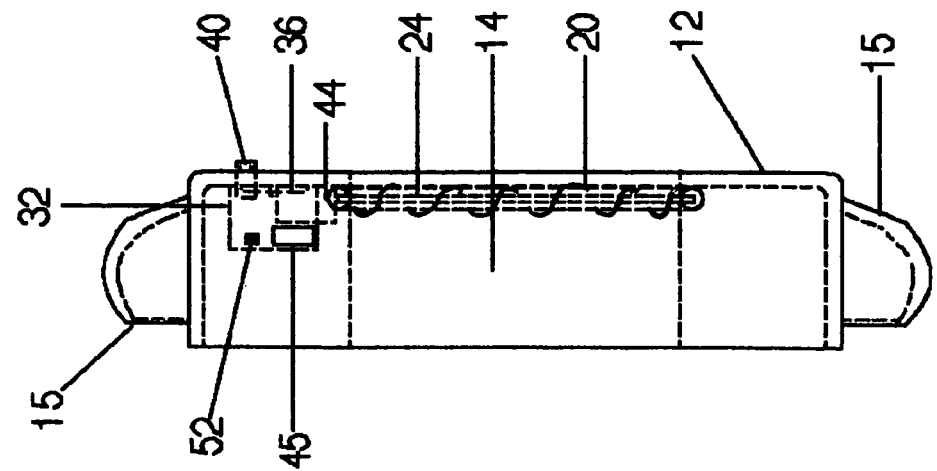
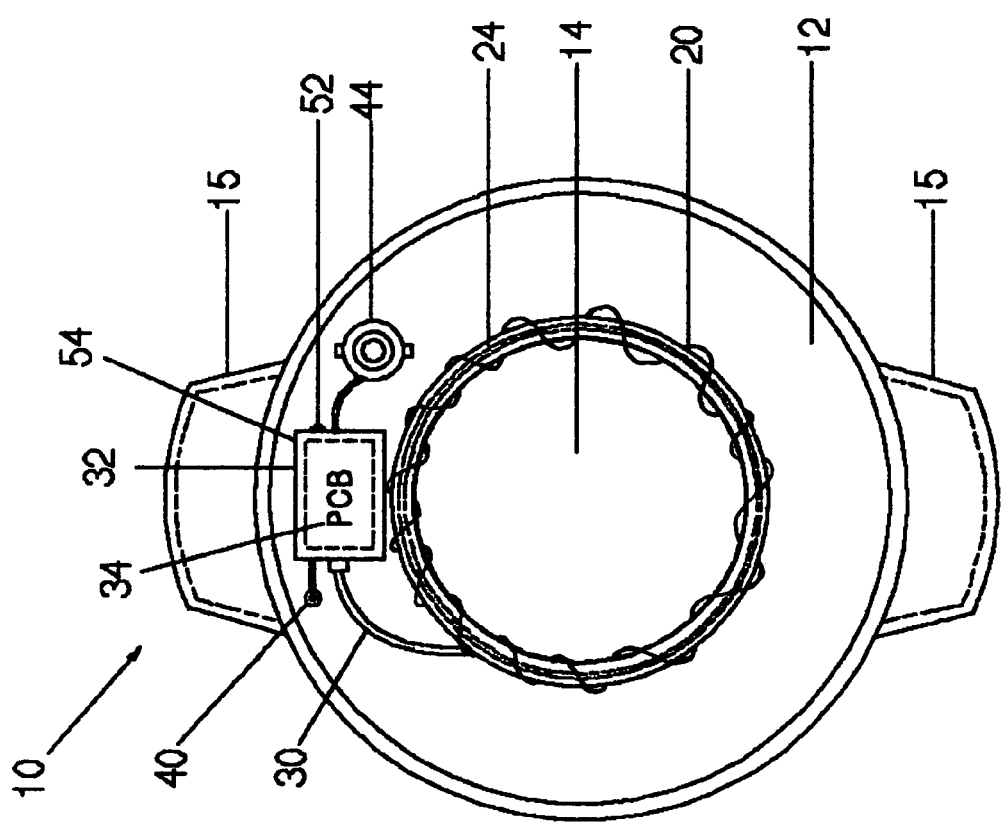

FERROUS METAL DETECTOR WITH ALARM

CROSS REFERENCE TO RELATED APPLICATIONS

This is a Continuation-in-Part of U.S. patent application Ser. No. 10/334,847 filed Dec. 30, 2002, now abandoned.

This is a non-provisional patent application claiming the benefit of the filing date of provisional U.S. patent application Ser. No. 60/382,448 filed May 22, 2002, now abandoned.

BACKGROUND OF THE INVENTION

The invention relates to metal detectors and, more particularly, to a detector that detects ferrous magnetic metal objects and generates a signal indicating the presence of the ferrous objects.

In a restaurant, many times eating utensils, such as silverware or stainless steel flatware, are accidentally thrown away and discarded unknowingly into the trash, thus costing many hundreds of dollars in loss. The problem results from the restaurant employees inadvertently tossing the silverware or flatware into the garbage while cleaning food and other waste from the restaurant's clientele's used plates.

Some restaurant kitchens use automatic means for rinsing and removing food and garbage from the plates. Also, food scrapers may be used to clean debris from the plates. The eating utensils may be inadvertently disposed of without the kitchen help being aware of the problem.

A flatware recover food scraper is disclosed in U.S. Pat. No. 4,367,138 to Kustas and includes a cylindrically shaped rubber food scraper mounted to a table over a refuse container, which is located below the table. Food and waste is scraped from the dishes and the stainless steel flatware is attracted to and held by magnets located within the scraper.

U.S. Pat. No. 4,494,657 to Oldenkamp discloses an integral housing member for removing magnetic articles from a flow of loosely packed material. The housing includes a magnetic article assembly which attracts and removes magnetic articles responsive to the magnetic field from a loosely packed material flow which is directed through the housing.

U.S. Pat. No. 4,279,744 to Antonwitsch discloses an apparatus for removing magnetic articles from a flow of loosely packed material. The apparatus includes an elongated shaft attached to a plurality of magnetic members for attracting, removing, and holding the magnetic articles.

However, these devices which attract and remove magnetic articles may miss silverware or flatware which is wrapped within napkins or positioned behind other non-magnetic articles. These devices do not detect the presence of eating utensils or signal a person that the eating utensil is being thrown away. Therefore, if the device does not actually attract and remove the eating utensil, then the eating utensil remains in the garbage.

U.S. Pat. No. 6,833,789 to Carmen discloses a detector having a coil detect the presence of magnetized ferrous metal objects. However, Carmen uses an oscillator to generate a voltage on the coil, which requires FCC approval. Additionally, Carmen does not use a non-ferrous core, the use of which would enhance the detection of the metal object.

U.S. Pat. No. 5,001,425 to Beling discloses a detector using a pair of detection coils and an oscillator. Beling does not use a non-ferrous core.

U.S. Application 2002/0067163 to Goldberg discloses a detector having two separate non-ferrous cores, having a coil wound about the outside surface of each solid core. The object passes between the two cores, but not through the cores, reducing the dependability of the detector.

Therefore, what is needed is an apparatus for detecting ferrous metal eating utensils that eliminates the inadvertent disposal of the eating utensils into garbage cans by utilizing a pick-up coil wound about a non-ferrous core that generates a voltage when a magnetized object passes through the coil and signals, either audibly and/or visually, a person that the eating utensil has been thrown into the garbage can. A person can then retrieve the eating utensil from the garbage.

SUMMARY OF THE INVENTION

An electronic ferrous metal detector for detecting a magnetized ferrous metal material or eating utensil passing through an opening in an object includes a coil wound on a non-ferrous core positioned circumferentially about the opening in the object or a garbage can for the passage of the ferrous metal material therethrough. The pick-up coil is positioned circumferentially about the opening and about the non-ferrous core for generating a voltage as the magnetic ferrous metal material is passed through the coil wound on the non-ferrous core and through the pick-up coil for detecting any ferrous metal material passing through the pick-up coil.

An electronic compartment houses electronic circuitry electrically connected to the pick-up coil for receiving the voltage generated by the pick-up coil and for producing an output. An alarm is electrically coupled to the electronic circuitry for receiving the output of the electronic circuitry housed with the electronic compartment and for signaling a person that the magnetized ferrous metal material has passed through the pick-up coil and through the opening in the object.

The pick-up coil has a sufficient number of wire windings wound about the non-ferrous core to produce the voltage. A power supply is electrically coupled to the electronic circuitry for providing power to the electronic ferrous metal detector. A reset switch is electrically coupled to the signaling device for resetting the signaling device. An on/off switch may be electrically coupled to the power supply for turning on and off the metal detector. A microprocessor may be coupled to the metal detector for controlling various functions of the metal detector, such as warning when the batteries are low, turning off the alarm if the alarm is not tended to in one minute, extending the life of the battery by turning the power supply on and off, for example, every 10 milliseconds, or by controlling any other desired function of the metal detector. Also, a solar panel may be added to trickle charge the batteries.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

FIG. 1 is an isometric view of a garbage can having an electronic ferrous metal detector;

FIG. 2 is a plan view of the electronic ferrous metal detector positioned in a garbage can lid of the garbage can with associated electronic components;

FIG. 3 is a side view of the electronic ferrous metal detector positioned in the garbage can lid of the garbage can with associated electronic components;

FIG. 6 is a view of a pick-up detector coil wound clockwise about a non-ferrous core of the electronic ferrous metal detector;

FIG. 7 is a side view of FIG. 6 showing the position of the clockwise wound detector coil and showing an electronic compartment positioned within the garbage can lid and having a DC voltage power supply;

DESCRIPTION OF THE PREFERRED EMBODIMENT

Figure 4:
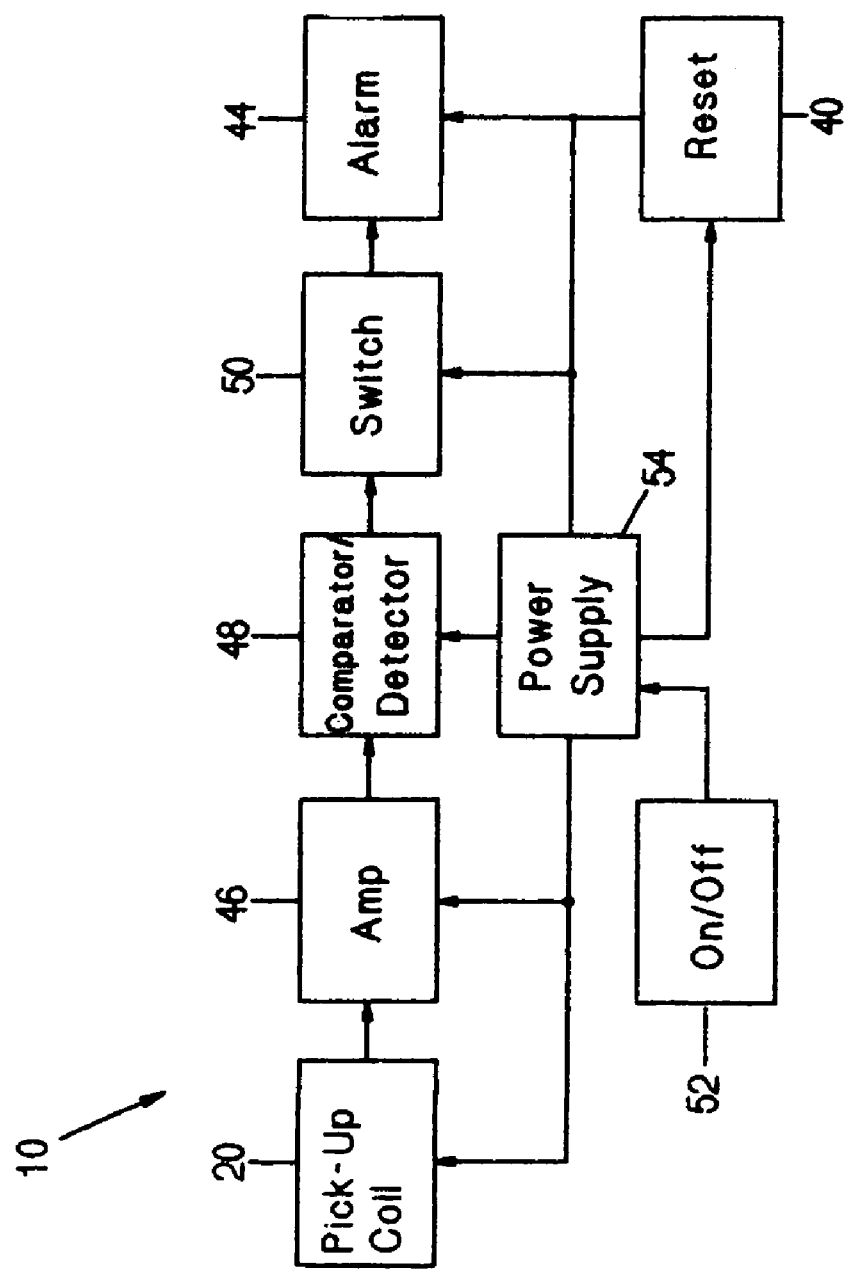
FIG. 4 is a block diagram of the electronic ferrous metal detector without a microprocessor.
Figure 5:
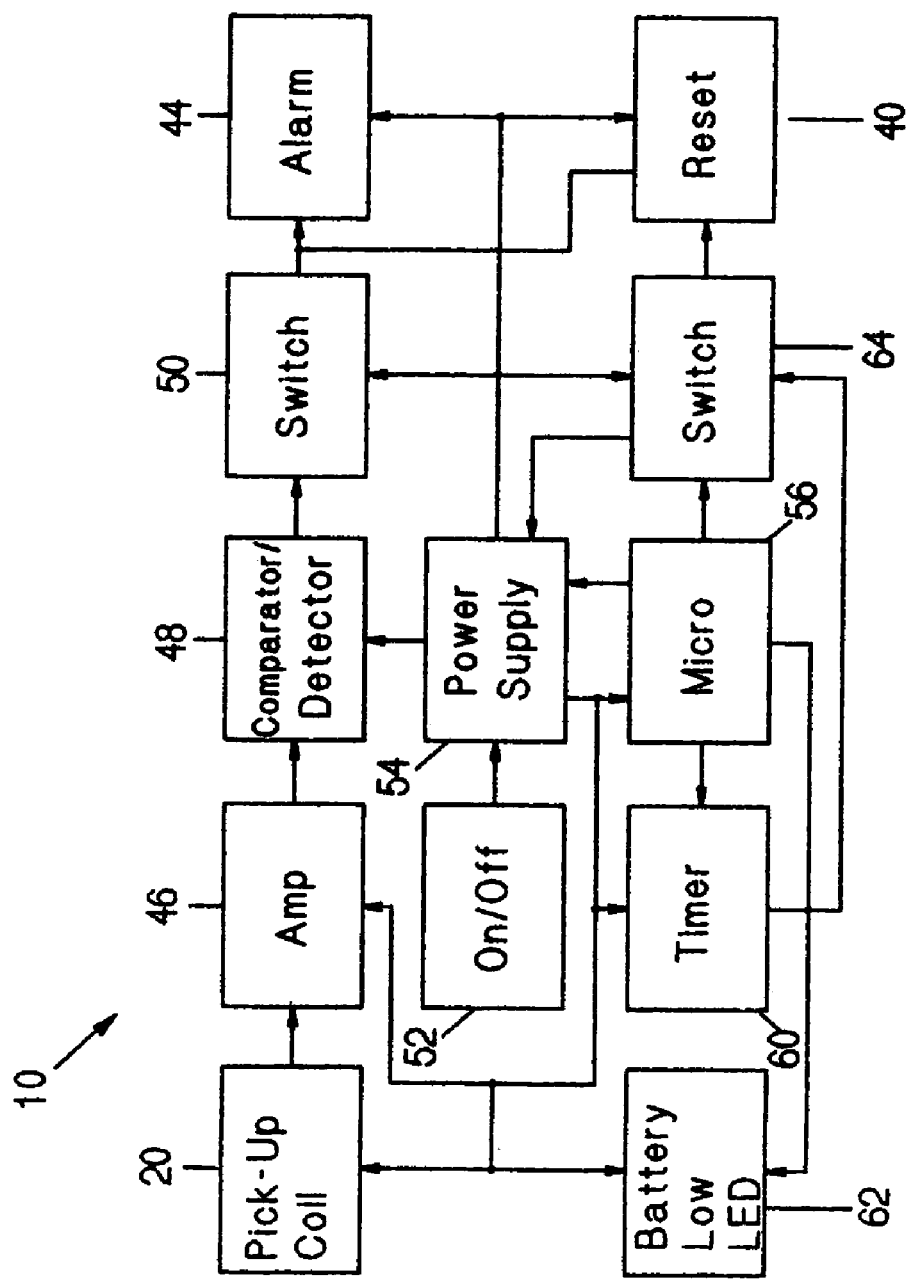
FIG. 5 is a block diagram of the electronic ferrous metal detector with a microprocessor.

The invention described herein provides a metal detector positioned within a lid of a garbage can which can detect when ferrous metals are passed through the lid, such as knives, forks, spoons, and the like. An alarm is sounded or lit to alert a person that a ferrous metal piece has accidentally been thrown away so that it can be retrieved.

Referring to FIGS. 1-5, an electronic ferrous metal detector 10 is attached to a garbage can lid 12 for detecting ferrous metal. A ferrous metal is any metal that a magnet is attracted to. The garbage can lid 12 has a hole 14 for the disposal of garbage therethrough and a handle 15. The metal detector 10 may be positioned on various types of garbage cans, or may be used in various other applications, such as in areas other than the restaurant industry, for the detection and warning of ferrous metal objects.

The metal detector 10 can be used to detect the passage of ferrous metal objects through the metal detector 10, such as to detect the inadvertent disposal of ferrous metal into a garbage can 16. For the restaurant industry, the ferrous metal may be silverware, stainless steel flatware, or any other type of eating utensil 18. For the metal detector 10 to detect the eating utensils, the eating utensils 18 must be slightly magnetized, which most silverware is.

The metal detector 10 will not detect non-ferrous material, such as aluminum cans, aluminum foil, non-magnetized objects, or the like.

The electronic ferrous metal detector 10 with alarm includes a ferrous metal pick-up coil 20 positioned about the hole 14 of the garbage can lid 12. The pick-up coil 20 includes a wire wound around a non-ferrous, non-magnetic core 24. The pick-up coil 20 is wound with the correct type of wire and enough wire sufficient for a strong enough signal when the magnetized ferrous metal passes through the pick-up coil 20 to produce a voltage in the coils 20. As one example, the wire of the coil 20 may be a 30 gauge piece of wire which is approximately 3000 feet long and should have a sufficient number of windings and turnings to provide enough gain or induction for the coil 20 to be sensitive enough to detect a slightly magnetized object.

Figure 8:
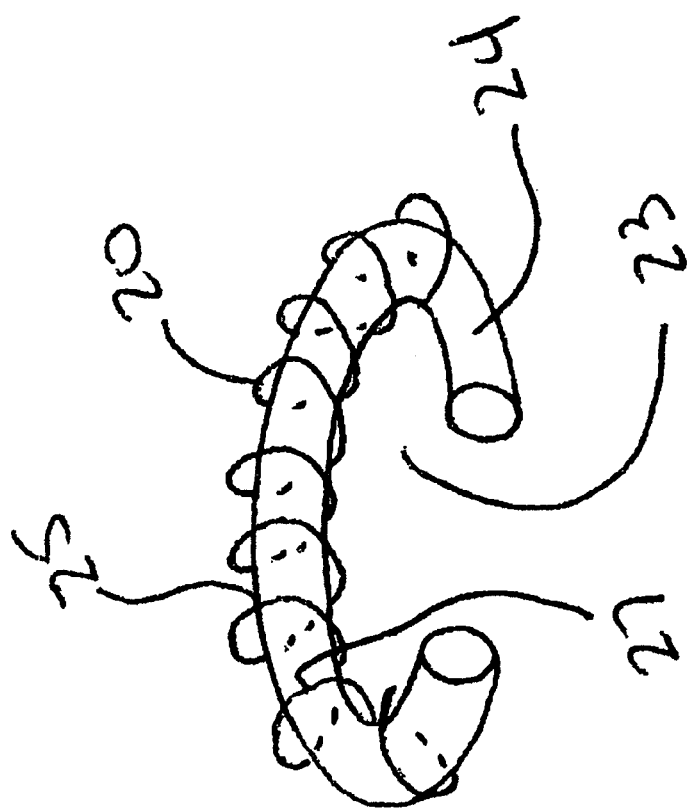
FIG. 8 is a partial isometric view of the detector coil wound about the non-ferrous core for forming a detector coil loop.

The core 24 may be brass, plastic, or any other suitable piece of non-ferrous, non-magnetic material. Referring to FIG. 8, which illustrates one example of the shape of the core 24, the core 24 may be a ring shaped material having an opening 23 therethrough. The core 24 may be a solid non-ferrous rod bent into a circular configuration, may be a continuous piece of material, or may have any other suitable configuration. Preferably, the opening 23 of the core 24 has a shape conforming to the shape of the hole 14 of the garbage can lid 12. The non-ferrous core 24 is positioned circumferentially about the hole 14 of the garbage can lid 12, thereby aligning the opening 23 of the core 24 and the hole 14 of the garbage can lid 12, so that the garbage passes through the opening 23 in the core 24 and through the opening 14 of the garbage can lid 12 into the garbage can 16.

Referring to FIGS. 6-8, the wire of the coil 20 is wrapped clockwise around the non-ferrous core 24. As illustrated in FIG. 8, the core 24 may be a solid circular member having the wire of the coil 20 wrapped around the longitudinal axis of the core 24, thereby positioning the coil 20 about both the inside and outside diameters of the annularly shaped core 24. The positioning of the coil 20 in the FIGS. 6-8 is merely for illustrative purposes. The actual windings may be closer together, may be tighter, may have a greater number of windings, etc.

The coil 20, including multiple windings about the core 24, forms a detector loop, having a top portion 25 and a center 27 for providing an optimum location for detecting the passage of silverware therethrough, and through the hole 14 of the garbage can. The clockwise wrapping of the coil 20 directs the sensitivity toward the top portion 25 and toward the center 27 of the detector coil loop 20, which in effect directs the sensitivity toward the top and center 14 of the opening or hole in the garbage can lid 12 for enhancing detection of the ferrous metal as the object or flatware passes through the hole 14. The clockwise wrapping gives the detector coil 20 more sensitivity in the direction needed to detect the flatware or object going though the opening 14 in the lid 12, thus lessening missed flatware.

Figure 9:
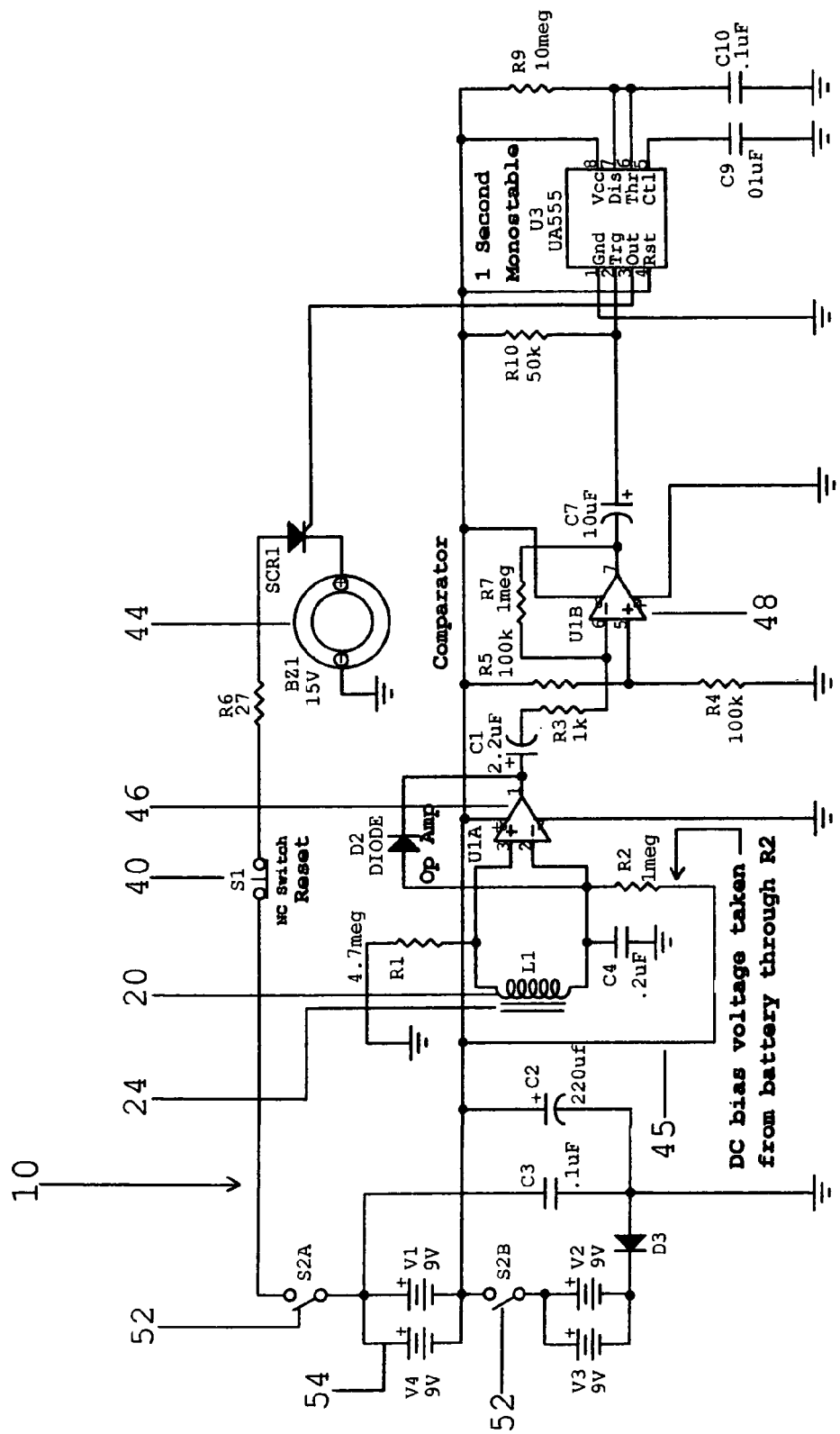
FIG. 9 is a schematic representation of the electronic ferrous metal detector.

Referring to FIGS. 1-8, in combination with the schematic representation of the electronic ferrous metal detector in FIG. 9, pick-up coil connection wire 30 is attached to the pick-up coil 20 and is electronically coupled to an electronic compartment 32. The electronic compartment 32 houses all of the electronic circuitry 34, such as a printed circuit board (PCB) 36, an operational amplifier (op-amp) 46, capacitors, resistors, diodes, switching devices, or other electronic components. A reset switch 40 is attached to the electronic compartment 32 and is coupled to the PCB 36 and/or to an alarm 44 for resetting the circuitry of the ferrous metal detector 10.

A signaling device or alarm 44 is attached to the garbage can lid 12 and electronically coupled to the electronic components or circuitry 34 housed within the electronic compartment 32. The alarm 44 may be a peizo type of alarm, may be a buzzer, or the like to audibly alert a person, or alternatively, may be a light, such as a LED, or the like to visually alert a person, or may be combinations thereof.

Referring to FIG. 7, the electronic compartment 32 further houses a DC voltage source 45, such as a battery. The DC voltage source 45 provides a small DC (direct current) Bias voltage through wire 30 to the coil 20 to increase the sensitivity to the magnetic field. The use of DC voltage eliminates the need to use an oscillator. The DC Bias voltage provides sensitivity to the incoming magnetized ferrous metal flatware or other object. The combination of the clockwise winding and the use of the DC Bias voltage causes the detection of the magnetic ferrous material to be more to the top and to the center of the detector coil 20 and more to the center 14 of the opening of the garbage can lid 12 as well as more sensitive. The DC Bias voltage also stabilizes the detector coil 20 at a preset voltage level, thus eliminating possible false triggering from other magnetic fields.

The detector coil 20 wound around the non-ferrous core 24 produces the pick-up detector loop for the slightly magnetized ferrous metals passing through the windings of the coil 20 and through the core 24. When the magnetic ferrous metal object passes through the windings of the pick-up detector loop, a small voltage is generated in the detector coil 20. The voltage output of the coil 20 is transferred to an amplifying circuit, such as the op-amp 46, that is then passed to a comparator 48 where it is compared to a reference to produce a sensitivity range. The output of the comparator 48 can switch the gate of a switch 50, such as a silicone controlled rectifier (SCR), Triac, or the like for turning on the alarm 44 to alert a person in the event that a piece of magnetized ferrous metal has been accidentally discarded. The alarm 44 can be turned off with a push-button, such as the reset switch 40, that resets the alarm 44 and the circuit. The comparator/detector 48, the op-amp 46 and the switch 50 may be housed within the compartment 32, along with batteries.

The metal detector 10 further includes an ON-OFF button 52 attached to the garbage can lid 12 and coupled to the electronic circuitry 34 housed within the electronic compartment 32 for enabling a person to manually turn on and shut off the power of the metal detector 10.

The metal detector 10 may include a power supply 54, such as a disposable battery, a rechargeable battery such as nickel cadmium, solar power, may be electrically powered, or may be powered by any other suitable type of power. As one example, the op-amp 46 may be powered by a 9V battery, a buzzer of the alarm 44 may be powered by a 15V supply, and a microprocessor may be powered by a 5V supply. As an alternative, if the metal detector 10 is electrically powered, the AC power will be changed to DC and stepped down with a transformer. The power supply 54 may be housed within the electronic compartment 32 and coupled to the electronic circuitry 34 of the metal detector 10.

For the various embodiments of this invention, the same reference characters will be used to designate like parts. In addition, like functions and like interactions of the parts among the various embodiments of this invention will not be repeated for each embodiment.

As an alternative, the efficiency and logic can be enhanced using a microprocessor and/or a switching power supply to extend the life of the batteries and to add options. As an example, the microprocessor 56 may be housed within the electronic compartment 32 and electrically coupled to the components in the compartment 32. As an example of some of the options that the microprocessor 56 may provide include putting the electronic circuitry 34 to sleep or turning the circuitry 34 off via the microprocessor 56 to conserve batteries, add timers, customize how the circuit works via the microprocessor, supply power to all of the circuits, or other improvements, which would be cost effective and efficient. With the microprocessor 56, the power supply 54 can be put to sleep or turned off or on by using the microprocessor or a timer 60 to turn the power supply off, for example, 10 times a second, decreasing the total length of time that the batteries are on, thus conserving battery life considerably. With the microprocessor 56, a warning can be provided if the batteries are low, thus telling when to change battery packs, for example, by using a battery low LED 62. Preferably, two battery packs will be used with AA batteries, one battery pack to power the alarm 44 or LEDs, and the other battery pack to power the amplifier 46 and comparator-detector 48. LEDs could be used to warn when to change the batteries. With the microprocessor 56, the alarm 44 or LEDs can be turned off by switch 64 in the event that the person fails to push the reset button 40 after a preset length of time, for example, a minute.

As yet another alternative, the power supply 54 may be replaced with an oscillator or switching power supply, which can extend the life or useful range of the batteries thus allowing the metal detector 10 to operate even when the battery voltage gets low, for example, 3 volts. The metal detector 10 using a switching power supply could still produce the needed 5 volts to run the amplifier 46, the comparator/detector 48, and the switches even when the batteries go as low as 2-3 volts, thus extending the useful life of the batteries.

In operation, the silverware or eating utensils 18 are slightly magnetized. If an eating utensil 18 is thrown into the garbage can 16, the alarm 44 signals a person that a piece of magnetized ferrous metal has passed through the detector 10 and the person can retrieve the utensil 18. The whole circuit uses an on/off switch 52 to turn the power on or off. The pick-up coil 20 is wound with enough turns and the correct type of wire to achieve the proper gain or induction that is needed when a piece of slightly magnetized ferrous metal passes by or through the coil 20 to generate or induce enough voltage and current to activate the input of the first stage of the op-amp 46. When the power is on, the pick-up coils 20 are slightly energized due to the DC Bias voltage from the voltage source 45 and detect when a piece of magnetized ferrous metal passes through the opening in the garbage can lid 12, or other device, generating a small electric current in the coil 20 which passes to the amplifying stage. Then, the op-amp 46 amplifies the voltage or small electric current from the coils 20 and passes the voltage to a comparator or detector 48 that is set to a preset reference point or threshold to control the sensitivity of the output of the comparator or detector 48. Once the voltage goes past the preset reference point, the comparator/detector 48 sends a signal or the output to the gate of the switch 50, such as a Triac or a SCR (silicone controlled rectifier), which in turn will power or carry the current to the alarm 44. The voltage fed into the alarm 44 will activate the alarm 44, for example, sound the buzzer or illuminate the Warning LEDs. The reset button 40 breaks the current to the switch 50 and shuts the alarm 44 off. The cycle starts over again unless the main power switch 52 is turned off.

Therefore, when a piece of magnetized ferrous metal, such as an eating utensil 18, is passed through the pick-up coil 20, a voltage is generated which goes to the second stage of the op-amp 46. The voltage is amplified in the op-amp 46 and is compared to a threshold in the second stage of the op/amp 46 and the output of the comparator 48 goes high at the presence of the eating utensil 18 and powers the switch 50, which is housed within the electronic compartment 32, which turns on the alarm 44. A person may retrieve the inadvertently disposed of eating utensil 18 from the garbage can 16.

An advantage of the electronic ferrous metal detector 10 is that the detector can be used to prevent the loss of eating utensils, such as knives, forks, spoons, etc. By detecting the eating utensils as the utensils 18 drop into the garbage can, the eating utensils can be retrieved from the garbage can.

Another advantage of the electronic ferrous metal detector 10 is that the detector only works on magnetized ferrous metals. Non-ferrous material will not set off the alarm 44, and therefore will not be falsely activated by aluminum foil, damp paper, etc. This is advantageous for the restaurant industry because they only want to detect and warn when eating utensils, i.e. spoons, forks, knives, etc. are accidentally discarded. Also, the metal detector 10 will still detect and warn of an accidental loss of ferrous metal even if they are wrapped in paper towels or other debris since magnetic lines of flux will go through any material.

Yet another advantage of the electronic ferrous metal detector 10 is that the metal detector 10 is an electric generator which generates a small voltage. There is no power in the coil 20 until a magnet or magnetized piece of material is passed through the coil 20. A slight current may pass through the coil 20.

Another advantage of the metal detector 10 is that it can be used in many other applications to detect and warn in the event that a magnetized ferrous metal object has passed through the metal detector.

Yet another advantage of the metal detector 10 is that the use of a DC Bias voltage source eliminates the need for FCC approval, reducing the overall cost of the detector.

Thus there has been shown and described a novel electronic ferrous metal detector with an alarm which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

We claim:

1. An electronic ferrous metal detector for detecting magnetized ferrous metal material passing through an opening in an object, the opening in the object having a center therethrough, comprising:
    one non-ferrous core positioned circumferentially about the opening in the object for the passage of the magnetized ferrous metal material therethrough;
    the magnetized ferrous metal material providing a magnetic field in the opening of the object as the magnetized ferrous metal material passes through the opening in the object;
    one continuous pick-up detector coil having a top portion, the detector coil positioned circumferentially about the opening in the object and wound clockwise about the one non-ferrous core for detecting the magnetic field provided by the magnetized ferrous metal material with only the one pick-up detector coil and generating a voltage as the magnetized ferrous metal material is passed through both the non-ferrous core and through the one clockwise wound pick-up detector coil for detecting the presence of the magnetized ferrous metal material within the opening of the object;
    a DC Bias voltage source electrically connected to the pick-up detector coil for providing a DC Bias voltage on the pick-up detector coil for increasing sensitivity of the detector coil and adding stability;
    the clockwise winding of the detector coil and the DC Bias voltage increasing sensitivity to the magnetic field, adding stability, and directing the sensitivity toward the top portion of the detector coil and to the center of the opening in the object; and
    an alarm electrically coupled to the one pick-up detector coil for receiving the voltage from the one pick-up detector coil and for signaling a person that the magnetized ferrous metal material has passed through the one pick-up detector coil and through the opening in the object for detecting any magnetized ferrous metal material passing through the one pick-up detector coil.

2. The electronic ferrous metal detector according to claim 1, further comprising an electronic compartment housing electronic circuitry electrically connected to the pick-up detector coil for receiving the voltage generated by the pick-up detector coil and for producing an output, and electrically connected to the alarm for transferring the output to the alarm for controlling the alarm.

3. The electronic ferrous metal detector according to claim 1, wherein the pick-up detector coil has a sufficient number of wire windings wound about the non-ferrous core.

4. The electronic ferrous metal detector according to claim 1, further comprising a power supply electrically coupled to the alarm for providing power to the electronic ferrous metal detector.

5. The electronic ferrous metal detector according to claim 1, further comprising a reset switch electrically coupled to the alarm for resetting the alarm.

6. The electronic ferrous metal detector according to claim 1, wherein the alarm further comprises a light for visually signaling a person that ferrous metal material has passed through the pick-up detector coil.

7. The electronic ferrous metal detector according to claim 1, wherein the alarm includes a buzzer for audibly signaling a person that ferrous metal material has passed through the pick-up detector coil.

8. The electronic ferrous metal detector according to claim 1, further comprising:
    a microprocessor coupled to the metal detector;
    a timer coupled to the microprocessor for automatically resetting the alarm; and
    a battery low indicator coupled to the microprocessor for providing a signal when power is low.

9. The electronic ferrous metal detector according to claim 3, further comprising an on/off switch electrically coupled to the power supply for turning on and off the metal detector.

10. An electronic ferrous metal detector for detecting a magnetized ferrous metal eating utensil that is disposed of into a garbage can by passing through a hole, having a center, in a garbage can lid, comprising:
    a non-ferrous core having an opening therethrough, the opening conforming to a shape of the hole in the garbage can lid, the non-ferrous core positioned circumferentially about the hole in the garbage can lid;
    the magnetized ferrous metal eating utensil providing a magnetic field in the hole of the garbage can lid as the magnetized ferrous metal eating utensil passes through the hole in the garbage can lid;
    one pick-up detector coil wound in a clockwise direction about the non-ferrous core forming a pick-up detector loop for detecting the magnetic field provided by the magnetized ferrous metal eating utensil passing through the one pick-up detector coil, the detector loop having a top portion, passage of the magnetized ferrous metal eating utensil through the one pick-up detector coil generating a voltage;
    the clockwise winding of the detector coil around the non-ferrous core directs detection of magnetic field sensitivity to the top portion of the detector coil loop and to the center of the garbage can lid hole;
    a DC Bias voltage source electrically connected to the pick-up detector coil for providing a DC Bias voltage on the pick-up detector coil for increasing sensitivity of the detector coil and adding stability;

an operational amplifying circuit connected to the one pick-up detector coil for receiving the voltage generated by the one pick-up detector coil and passing the voltage therethrough;

a comparator connected to the operational amplifying circuit for receiving the voltage passed through the operational amplifying circuit, for controlling sensitivity, and for producing an output; and a signaling device connected to the comparator for receiving the output from the comparator and producing a signal to alert a person that the magnetized ferrous material eating utensil has passed through the one pick-up detector coil and into the garbage can.

11. The electronic ferrous metal detector according to claim 10, further comprising a switch electrically coupled between the comparator and the signaling device for carrying the voltage from the comparator to the signaling device.

12. The electronic ferrous metal detector according to claim 10, further comprising a reset switch connected to the signaling device for resetting the signaling device.

13. The electronic ferrous metal detector according to claim 10, wherein the pick-up detector coil has a sufficient number of wire windings wound about the non-ferrous core for detecting the magnetized eating utensil and producing the voltage.

14. The electronic ferrous metal detector according to claim 10, further comprising a power supply electrically coupled to the electronic circuitry for providing power to the electronic ferrous metal detector.

15. The electronic ferrous metal detector according to claim 10, further comprising a microprocessor coupled to the electronic ferrous metal detector.

16. The electronic ferrous metal detector according to claim 14, further comprising an on/off switch electrically coupled to the power supply for turning on and off the metal detector.

17. An electronic ferrous metal detector for detecting magnetized ferrous metal material passing through an opening in an object, comprising:

a non-ferrous core positionable on the object having the opening for the passage of the magnetized ferrous metal material therethrough;

the magnetized ferrous metal material providing a magnetic field in the opening of the object as the magnetized ferrous metal material passes through the opening in the object;

one pick-up detector coil having a sufficient number of wire windings wound about the non-ferrous core for detecting the magnetic field provided by the magnetized ferrous metal material and generating a voltage as the magnetized ferrous metal material passes through the one pick-up detector coil, through the non-ferrous core and through the opening of the object;

electronic circuitry electrically connected to the one pick-up detector coil for receiving the voltage generated by the one pick-up detector coil and for producing an output;

a DC Bias voltage source electrically connected to the pick-up detector coil for providing a DC Bias voltage and passing the DC Bias voltage through the detector coil for increasing sensitivity and adding stability of the pick-up detector coil to the magnetic field;

a signaling device electrically coupled to the electronic circuitry for receiving the output of the electronic circuitry and for signaling a person that magnetized ferrous metal material has passed through the one pick-up detector coil and through the opening in the object; and a power supply coupled to the electronic circuitry for supplying power to the electronic ferrous metal detector.

18. The electronic ferrous metal detector according to claim 17, wherein the signaling device includes a light for visually signaling a person that ferrous metal material has passed through the pick-up detector coil.

19. The electronic ferrous metal detector according to claim 17, wherein the signaling device audibly signals a person that ferrous metal material has passed through the pick-up detector coil.

20. The electronic ferrous metal detector according to claim 17, further comprising a reset switch electrically coupled to the signaling device for resetting the signaling device.

* * * * *